United States Patent
Kurihara et al.

(10) Patent No.: US 9,297,592 B2
(45) Date of Patent: Mar. 29, 2016

(54) MOISTURE SEPARATOR REHEATER AND NUCLEAR POWER PLANT

(71) Applicant: Kabushiki Kaisha Toshiba, Minato-ku (JP)

(72) Inventors: Shogo Kurihara, Kanagawa (JP); Koichi Yoshimura, Kanagawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 176 days.

(21) Appl. No.: 14/015,058

(22) Filed: Aug. 30, 2013

(65) Prior Publication Data

US 2014/0060052 A1    Mar. 6, 2014

(30) Foreign Application Priority Data

Sep. 4, 2012 (JP) .................. 2012-193892

(51) Int. Cl.
*F22B 37/26* (2006.01)
*F28F 9/22* (2006.01)
*F28F 9/02* (2006.01)
(Continued)

(52) U.S. Cl.
CPC .............. *F28F 9/0202* (2013.01); *F16T 1/34* (2013.01); *F22B 37/266* (2013.01); *F22B 37/268* (2013.01); *F28F 9/22* (2013.01); *F28D 2021/0054* (2013.01); *F28F 2009/0285* (2013.01); *F28F 2009/226* (2013.01)

(58) Field of Classification Search
CPC .... F22B 37/266; F22B 37/268; F28F 9/0202; F28F 9/0209; F28F 9/0214; F28F 9/22; F28F 2009/226; F28F 2009/0285; F28D 7/06; F28D 2021/0054; F28D 3/02; F28D 1/047; F28D 1/0475; F28D 1/05341
See application file for complete search history.

(56) References Cited

U.S. PATENT DOCUMENTS 3,508,527 A * 4/1970 Durrer .......................... 122/483
3,593,500 A * 7/1971 Ritland et al. .................. 55/319
3,744,459 A * 7/1973 Reed .............................. 122/483
(Continued)

FOREIGN PATENT DOCUMENTS

CN      86 1 02022 A    9/1986
JP      62-228806 A    10/1987
(Continued)

OTHER PUBLICATIONS

Extended European Search Report issued Feb. 3, 2015 in Patent Application No. 13182468.2.
(Continued)

*Primary Examiner* — Thomas Denion
*Assistant Examiner* — Xiaoting Hu
(74) *Attorney, Agent, or Firm* — Oblon, McClelland, Maier & Neustadt, L.L.P.

(57) ABSTRACT

One embodiment of a moisture separator reheater includes: heater headers that supply the heating fluid to heat transfer tube groups for heat exchange with the steam; partition plates that guide the steam from a moisture removal section to the heat transfer tube group and then to the heat transfer tube group. The heat transfer tube groups each includes a plurality of heat transfer tubes each having a forward passage part, a backward passage part, and a bent tube part. The forward and the backward passage parts extend in a longitudinal direction of a body drum and the bent tube part connects the forward and the backward passage parts. The bent tube pipe is provided outside end plates.

6 Claims, 5 Drawing Sheets

(51) Int. Cl.
*F16T 1/34* (2006.01)
*F28D 21/00* (2006.01)

(56) References Cited

U.S. PATENT DOCUMENTS

| | | | |
|---|---|---|---|
| 3,996,897 A | | 12/1976 | Herzog |
| 4,015,562 A | | 4/1977 | Yousoufian |
| 4,016,835 A | | 4/1977 | Yarden et al. |
| 4,220,194 A | * | 9/1980 | Shade et al. ............ 165/113 |
| 4,223,722 A | | 9/1980 | Shade, Jr. |
| 4,300,481 A | * | 11/1981 | Fisk ...................... 122/406.3 |
| 4,717,400 A | * | 1/1988 | Ozeki et al. ............. 55/434.3 |
| 2011/0290459 A1 | * | 12/2011 | Kurita et al. ............ 165/157 |

FOREIGN PATENT DOCUMENTS

| | | |
|---|---|---|
| JP | 2010-60222 | 3/2010 |
| JP | 2011-94839 | 5/2011 |
| KR | 1991-0002216 B1 | 4/1991 |

OTHER PUBLICATIONS

Examination Search Report issued Mar. 5, 2015 in Canadian Patent Application No. 2,826,310.
Office Action issued Jul. 2, 2014 in Korean Patent Application No. 10-2013-0103690 (with partial English language translation).
Combined Chinese Office Action and Search Report issued Sep. 1, 2015 in Patent Application No. 201310394770.4 (with English translation of categories of cited documents).

* cited by examiner

MOISTURE SEPARATOR REHEATER AND NUCLEAR POWER PLANT

CROSS REFERENCE TO RELATED APPLICATION

This application is based upon and claims the benefit of priority from Japanese Patent Application No. 2012-193892, filed on Sep. 4, 2012, the entire content of which is incorporated herein by reference.

FIELD

Embodiments described herein relate to a moisture separator reheater that removes moisture contained in steam to be heated and reheats the resultant steam to be heated, and a nuclear power plant.

BACKGROUND

A moisture separator reheater (MSR) installed in a nuclear power plant, etc., has two functions: a function that removes moisture in moist steam exhausted from a high pressure turbine; and a function that reheats the steam to be heated, from which the moisture has been removed, through heat exchange with heated fluid. For example, as the heated fluid, main steam from a steam generator, extraction steam of a high-pressure turbine, or the like is used. The steam to be heated that has been reheated in the moisture separator reheater is supplied to a low pressure turbine, etc.

In a case where a configuration in which a heater header is provided outside a body drum is applied to the moisture separator reheater as a design of a pressure vessel, an opening portion penetrating the body drum is generally formed into a circular shape. On the other hand, a horizontal cylindrical type heater header is generally installed inside the body drum. In recent years, strength analysis technology enables a design of a structure having an opening portion having a shape other than the circular shape.

With regard to such a moisture separator reheater, there is known a technology disclosed in, e.g., Japanese Patent Application Laid-Open Publication No. 2010-60222. According to this technology, a partition plate is installed inside the body drum. A position of the partition plate is determined depending on a position of the heater header or position of U-shaped bent tube parts of a tube bundle. The partition plate prevents the steam to be heated from flowing to a portion (hereinafter, referred to as "ineffective portion") at which the heated fluid does not contribute to heat exchange, such as a portion where no heat exchanger tube exists or the U-shaped bent tube part of the tube bundle.

Moreover, in a technology disclosed in Japanese Patent Application Laid-Open Publication No. 2011-94839, two heater headers arranged in a vertical direction are mounted to one side of the body drum. Also in this case, there is a need to install the partition plate inside the heater header.

However, in the above-described conventional moisture separator reheater, installation of the partition plate in the body drum may generate a space like the above ineffective portion that is not utilized for the function of the moisture separator reheater. This may increase a length of the tube bundle for ensuring a required heat transfer area, resulting in an increase in size of the moisture separator reheater. Moreover, under the circumstances where the size of the moisture separator reheater tends to increase with an increase in output power of the nuclear power plant, the sizes of constituent devices need to be reduced.

Embodiments of the present invention have been made in view of the above situations, and an object thereof is to provide a moisture separator reheater capable of ensuring a required heat transfer area with short heat exchanger tubes to thereby allow reduction in the size thereof, and a nuclear power plant having such a moisture separator reheater.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION

Figure 1:
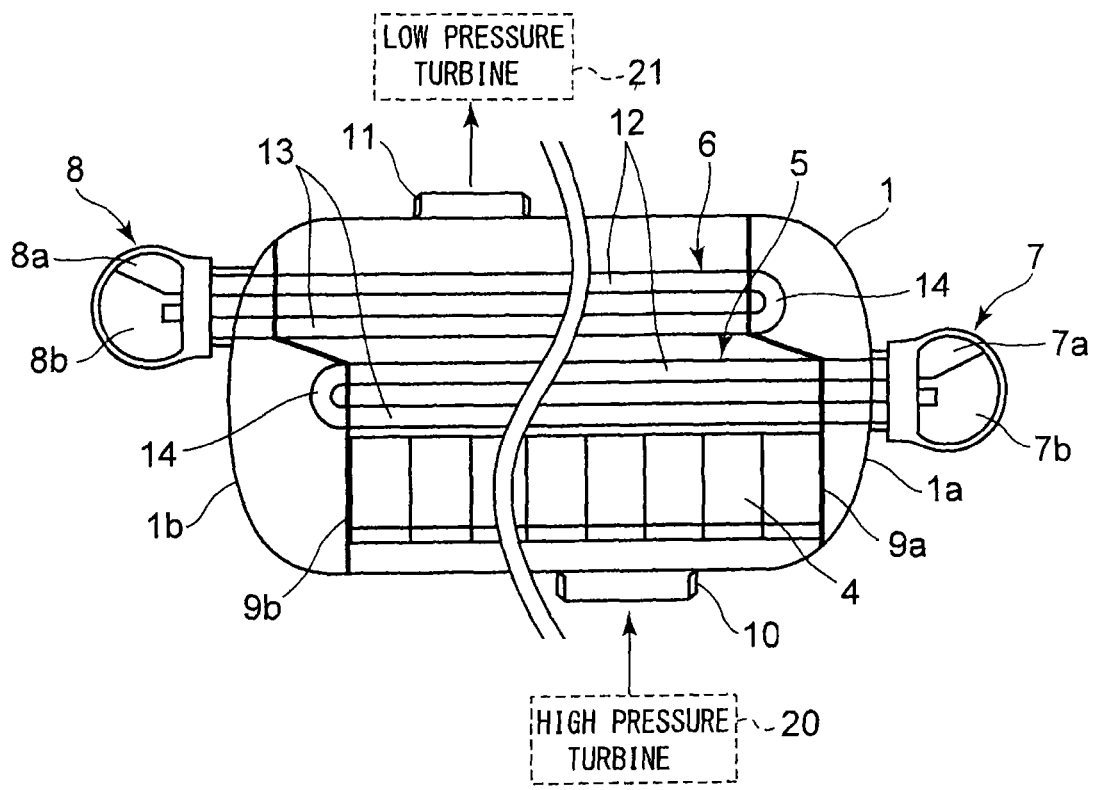
FIG. 1 is a front view schematically illustrating a configuration of a first embodiment of a moisture separator reheater according to the present invention.

According to one embodiment, there is provided a moisture separator reheater comprising: a horizontal cylindrical type body drum having a steam inlet for introducing thereinside steam to be heated at its lower portion and a steam outlet for exhausting therefrom the steam at its upper portion end plates that seal both end portions of the body drum in a longitudinal direction thereof; a moisture removal section that removes moisture in the steam distributed inside the body drum; a heat transfer tube group disposed above the moisture removal section, heating fluid for heating the steam being distributed in the heat transfer tube group; a heater header that supplies the heating fluid to the heat transfer tube group and exhausts outside the heating fluid that has been heat exchanged with the steam; and a partition plate disposed inside the body drum so as to guide the steam from the moisture removal section to the heat transfer tube group; the heat transfer tube group including a plurality of heat transfer tubes each having a forward passage part, a backward passage part, and a bent tube part, the forward and the backward passage parts extending in longitudinal direction of the body drum and the bent tube part connecting the forward and the backward passage parts, the bent tube part being provided outside the end plates.

Further, according to another embodiment, there is provided a moisture separator reheater comprising: a horizontal cylindrical type body drum having a steam inlet for introducing thereinside steam to be heated at its lower portion and a steam outlet for exhausting therefrom the steam at its upper portion; end plates that seal both end portions of the body drum in a longitudinal direction thereof; a moisture removal section that removes moisture in the steam distributed inside the body drum; a heat transfer tube group disposed above the moisture removal section, heating fluid for heating the steam being distributed in the heat transfer tube group; a heater header that supplies the heating fluid to the heat transfer tube group and exhausts outside the heating fluid that has been heat exchanged with the steam; and a partition plate disposed inside the body drum so as to guide the steam from the moisture removal section to the heat transfer tube group; the heat transfer tube group including a plurality of heat transfer tubes each having a forward passage part, a backward passage part, and a bent tube part, the forward and the backward passage parts extending in longitudinal direction of the body drum and the bent tube part connecting the forward and the backward passage parts, the partition plate being disposed along a side surface of the moisture removal section and being bent so as to be disposed on an inward side of the bent tube part.

Further, according to yet another embodiment, there is provided a nuclear power plant comprising: a high pressure turbine; and a moisture separator reheater that removes moisture in steam to be heated exhausted from the high pressure turbine and reheats the resultant steam to be heated, the moisture separator reheater including: a horizontal cylindrical type body drum having a steam inlet for introducing thereinside steam to be heated at its lower portion and a steam outlet for exhausting therefrom the steam at its upper portion; end plates that seal both end portions of the body drum in a longitudinal direction thereof; a moisture removal section that removes moisture in the steam distributed inside the body drum; a heat transfer tube group disposed above the moisture removal section, heating fluid for heating the steam being distributed in the heat transfer tube group; a heater header that supplies the heating fluid to the heat transfer tube group and exhausts outside the heating fluid that has been heat exchanged with the steam; and a partition plate disposed inside the body drum so as to guide the steam from the moisture removal section to the heat transfer tube group; the heat transfer tube group including a plurality of heat transfer tubes each having a forward passage part, a backward passage part, and a bent tube part, the forward and the backward passage parts extending in longitudinal direction of the body drum and the bent tube part connecting the forward and the backward passage parts, the bent tube part being provided outside the end plates.

Hereinafter, embodiments of a moisture separator reheater according to the present invention will be described with reference to the drawings.

Although a high pressure turbine 20 and a low pressure turbine 21 are illustrated in a first embodiment, the illustrations thereof are omitted in second and subsequent embodiments.

First Embodiment

Configuration

FIG. 1 is a front view schematically illustrating a configuration of the first embodiment of a moisture separator reheater according to the present invention.

A moisture separator reheater of the present embodiment is installed in a nuclear power plant and is configured to, as illustrated in FIG. 1, remove moisture in moist steam exhausted from a high pressure turbine 20, reheat the steam, from which the moisture has been removed, through heat exchange with heated fluid, and supply the steam that has been reheated to a low pressure turbine 21, etc.

The moisture separator reheater of the present embodiment includes a cylindrical body drum 1 having longitudinal direction both end portions sealed by end plates 1a and 1b and arranged horizontally such that the longitudinal direction thereof is made horizontal in an installation state, a moisture removal section 4 disposed at a lower portion of the body drum 1, first and second heat transfer tube groups 5 and 6 disposed at an upper portion of the body drum 1, first and second heater headers 7 and 8, a pair of partition plates 9a and 9b disposed in the body drum 1.

A steam inlet 10 for introducing thereinside steam to be heated is provided at a bottom of the body drum 1, and a steam outlet 11 for exhausting therefrom the steam that has been distributed inside the body drum 1 and has been heated is provided at a top of the body drum 1. Inside the body drum 1, a to-be-heated steam flow path extending from the steam inlet 10 to steam outlet 11 is formed in a space partitioned by the pair of partition plates 9a and 9b. The end plates 1a and 1b are curved end surfaces formed at both end portions of the body drum 1 in the longitudinal direction thereof.

The moisture removal section 4 is configured to remove moisture in the steam to be heated introduced from the steam inlet 10 and distribute the steam, from which the moisture has been removed, around the first and the second heat transfer tube groups 5 and 6 disposed thereabove.

The first and the second heat transfer tube groups 5 and 6 are disposed above the moisture removal section 4 in the body drum 1. Inside the first and the second heat transfer tube groups 5 and 6, heating fluid for heating the steam is distributed. More specifically, the first and the second heat transfer tube groups 5 and 6 are installed such that the heating fluid in the first heat transfer tube group 5 and the heated fluid in the second heat transfer tube group 6 flow in the opposite direction to each other. The steam flows in a space outside the first and the second heat transfer tube groups 5 and 6 to be heat exchanged with the heating fluid.

In the present embodiment, two types of heating fluids having different temperatures, i.e., first heating fluid flows in the first heat transfer tube group 5 and the second heating fluid having a temperature higher than that of the first heating fluid flows in the second heat transfer tube group 6.

The first and the second heat transfer tube groups 5 and 6 are each obtained by bending a plurality of tubes each having openings at its both ends into U-shape such that a straight parts thereof extends horizontally.

That is, the first and the second heat transfer tube groups 5 and 6 each include a forward passage part 12 extending horizontally from an opening formed on a side at which the first or the second heated fluid flows in, a backward passage part 13 disposed below the forward passage part 12 so as to extend in parallel thereto and having an opening for exhausting therethrough the first or the second heated fluid, and a bent tube part 14 connecting the forward passage part 12 and the backward passage part 13 at a side away from the opening side.

The first heat transfer tube group 5 is disposed such that a supply side at which the first heating fluid is supplied and an exhaust side at which the first heating fluid is exhausted are located at the same side. Similarly, the second heat transfer tube group 6 is disposed such that the supply side at which the second heating fluid is supplied and the exhaust side at which the second heating fluid is exhausted are located at the same side.

For example, as the first and the second heating fluids, main steam from a steam generator, extraction steam of a high-pressure turbine, or the like is used.

The first heater header 7 is installed in a state where the entire body is exposed outside the end plate 1a provided on one side of the moisture separator reheater. The first heater header 7 is a pressure vessel connected to the forward passage part 12 and the backward passage part 13 of the first heat transfer tube group 5 while keeping airtightness in the end plate 1a. The first heater header 7 includes a first heating fluid supply section 7a to which the first heating fluid is supplied and a first heating fluid exhaust section 7b from which the first heating fluid is exhausted.

Similarly, the second heater header 8 is installed in a state where the entire body is exposed outside the end plate 1b provided on the other side of the moisture separator reheater. The second heater header 8 is a pressure vessel connected to the forward passage part 12 and the backward passage part 13 of the second heat transfer tube group 6 while keeping airtightness in the end plate 1b. The second heater header 8 includes a second heating fluid supply section 8a to which the second heated fluid is supplied and a second heating fluid exhaust section 8b from which the second heating fluid is exhausted.

The first and the second heater headers 7 and 8 are attached to the end plates 1a and 1b, respectively, through a not illustrated attachment so as to avoid stress concentration on the end plates 1a and 1b.

In the body drum 1, the pair of partition plates 9a and 9b guide the steam from the moisture removal section 4, through the first heat transfer tube group 5, to the second heat transfer tube group 6. More specifically, the pair of partition plates 9a and 9b are disposed inside the bent tube parts 14 of the first and the second heat transfer tube groups 5 and 6. Moreover, the pair of partition plates 9a and 9b are disposed so as to come close to the first and the second heater headers 7 and 8, respectively.

That is, the pair of partition plates 9a and 9b are disposed to pass inside the portions (ineffective portions) at which the heating steam does not contribute to heat exchange, such as the bent tube parts 14 of the first and the second heat transfer tube groups 5 and 6 and portions near the first and the second heater headers 7 and 8 and are thus each formed integrally in a bent manner.

More specifically, the partition plate 9a is formed integrally such that it extends vertically from one side surface of the moisture removal section 4 to a portion near the first heater header 7, then bent inward from an upper portion of the portion near the first heat transfer tube group 5, and then bent once again to vertically extend inside the bent tube part 14 of the second heat transfer tube group 6.

On the other hand, the partition plate 9b is formed integrally such that it extends vertically from the other side surface of the moisture removal section 4 to a portion inside the bent tube part 14 of the first heat transfer tube group 5, then bent outward from an upper portion of the bent tube part 14, and then bent once again to vertically extend from a portion near the second heater header 8.

[Operations and Effects]

The following describes operation of the present embodiment.

First, flows of the first and the second heated fluids will be described.

The first heating fluid is supplied from outside to the first heating fluid supply section 7a of the first heater header 7. The first heating fluid supplied to the first heating fluid supply section 7a is supplied to the forward passage part 12 of each heat transfer tube of the first heat transfer tube group 5. The first heating fluid flowing in the forward passage part 12 then flows to the bent tube part 14 and the backward passage part 13.

The first heating fluid flowing in the forward passage part 12, the bent tube part 14, and the backward passage part 13 is heat exchanged with the steam to be cooled. The first heating fluid distributed in the backward passage part 13 then flows to the first heated fluid exhaust section 7b of the first heater header 7 and then exhausted outside through a not illustrated drain port, etc.

Similarly, the second heating fluid is supplied from outside to the second heating fluid supply section 8a of the second heater header 8. The second heating fluid supplied to the second heating fluid supply section 8a is supplied to the forward passage part 12 of each heat transfer tube of the second heat transfer tube group 6. The second heated fluid flowing in the forward passage part 12 then flows to the bent tube part 14 and the backward passage part 13.

The second heating fluid flowing in the forward passage part 12, bent tube part 14, and the backward passage part 13 heats the steam that has been heated by the first heating fluid. The second heating fluid distributed in the backward passage part 13 then flows to the second heating fluid exhaust section 8b of the second heater header 8 and then exhausted outside through a not illustrated drain port, etc.

The following describes a flow of the steam of the present embodiment.

The steam exhausted from the high pressure turbine 20 is introduced between the pair of partition plates 9a and 9b in the body drum 1 through the steam inlet 10 provided at the bottom of the body drum 1. Thereafter, the steam passes through the moisture removal section 4 and, thereby, the moisture therein is removed. The steam, from which the moisture has been removed, is supplied to a part of the first heat transfer tube group 5 partitioned by the pair of partition plates 9a and 9b. Then, the steam goes up while being heat exchanged with the first heating fluid flowing in each heat transfer tube of the first heat transfer tube group 5.

Subsequently, the steam is supplied to a part of the second heat transfer tube group 6 partitioned by the pair of partition plates 9a and 9b and goes up while being heat exchanged with the second heating fluid flowing in each heat transfer tube of the second heat transfer tube group 6. Then, the steam is exhausted through the steam outlet 11 provided at the top of the body drum 1. The exhausted steam is supplied to the low pressure turbine 21, etc.

Thus, the heated steam is exhausted outside while being straightened by the pair of partition plates 9a and 9b. As illustrated in FIG. 1, the partition plates 9a and 9b are shaped so as to minimize the ineffective portions of the first and the second heat transfer tube groups 5 and 6.

That is, the pair of partition plates 9a and 9b are disposed such that the steam is distributed in an area excluding the bent tube parts 14 of the first and the second heat transfer tube groups 5 and 6 and portions near the first and the second heater headers 7 and 8.

As described above, according to the present embodiment, the flow of the steam is guided by the pair of partition plates 9a and 9b, whereby the steam can be made to flow in an area which has conventionally been treated as the ineffective portion. This allows a heat transfer area to be ensured with a shorter tube bundle. As a result, the size of the moisture separator reheater can be reduced.

Second Embodiment

Figure 2:
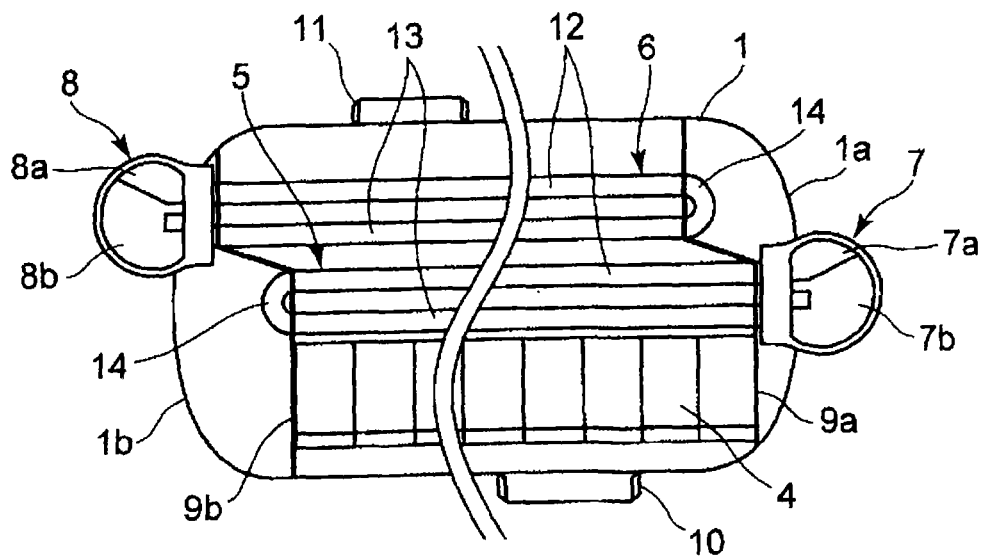
FIG. 2 is a front view schematically illustrating a configuration of a second embodiment of the moisture separator reheater according to the present invention.

FIG. 2 is a front view schematically illustrating a configuration of a second embodiment of the moisture separator reheater according to the present invention. In the following embodiments, the same reference numerals are given to the same parts as those of the first embodiment, and the repeated description will be omitted.

As illustrated in FIG. 2, the moisture separator reheater according to the present embodiment differs from the moisture separator reheater according to the first embodiment in that the first and the second heater headers 7 and 8 are installed so as to be inserted through the end plates 1a and 1b up to outer surfaces of the pair of partition plates 9a and 9b.

Thus, the first and the second heater headers 7 and 8 are partially exposed outside through the end plates 1a and 1b, respectively.

As described above, according to the present embodiment, the first and the second heater headers 7 and 8 are installed so as to be inserted through the end plates 1a and 1b up to outer surfaces of the pair of partition plates 9a and 9b, so that the ineffective portions on the sides of the first and the second heater headers 7 and 8 can be further reduced. This allows a heat transfer area to be ensured with a shorter tube bundle, thereby allowing further reduction in the size of the moisture separator reheater.

Third Embodiment

Figure 3:
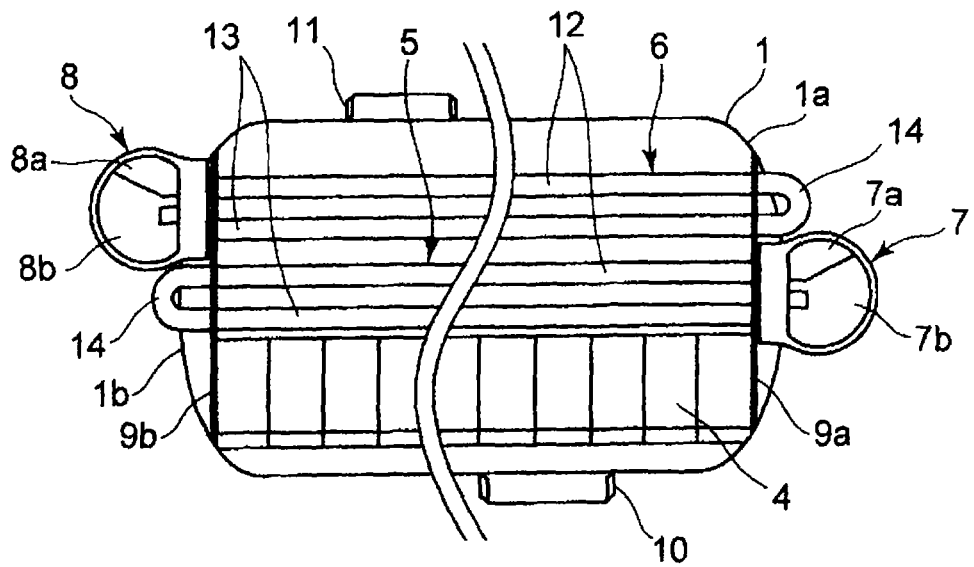
FIG. 3 is a front view schematically illustrating a configuration of a third embodiment of the moisture separator reheater according to the present invention.

FIG. 3 is a front view schematically illustrating a configuration of a third embodiment of the moisture separator reheater according to the present invention.

As illustrated in FIG. 3, the moisture separator reheater according to the present embodiment differs from the moisture separator reheater according to the second embodiment in that the bent tube parts 14 (i.e., ineffective portions) of the first and the second heat transfer tube groups 5 and 6 are installed outside the end plates 1a and 1b, respectively. The pair of partition plates 9a and 9b are disposed within a space between the end plates 1a and 1b so as not to make the steam flow in the bent tube parts 14.

The first heater header 7 and the bent tube part 14 of the second heat transfer tube group 6 are disposed adjacent to each other in the vertical direction. Similarly, the bent tube part 14 of the first heat transfer tube group 5 and the second heater header 8 are disposed adjacent to each other in the vertical direction. Thus, each of the partition plates 9a and 9b need not be bent but can be formed into a flat surface.

As described above, according to the present embodiment, the bent tube parts 14 (i.e., ineffective portions) of the first and the second heat transfer tube groups 5 and 6 are installed outside the end plates 1a and 1b, respectively, so that the ineffective portions of the first heater header 7 and the second heat transfer tube group 6 can be further reduced.

Moreover, according to the present embodiment, the ineffective positions are disposed adjacent to each other, so that each of the partition plates 9a and 9b that removes the ineffective portion can be formed into a flat surface. Thus, it is possible to reduce an unnecessary space in the body drum 1 that is not involved in the moisture separator reheater performance with the partition plates 9a and 9b having the minimum size. As a result, the size of the moisture separator reheater can be further reduced.

Fourth Embodiment

Figure 4:
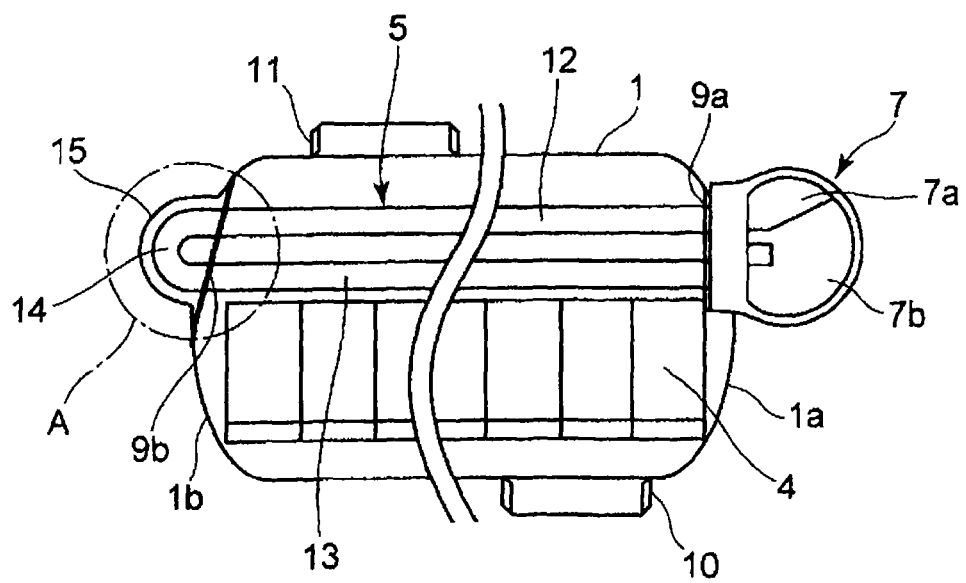
FIG. 4 is a front view schematically illustrating a configuration of a fourth embodiment of the moisture separator reheater according to the present invention.
Figure 5:
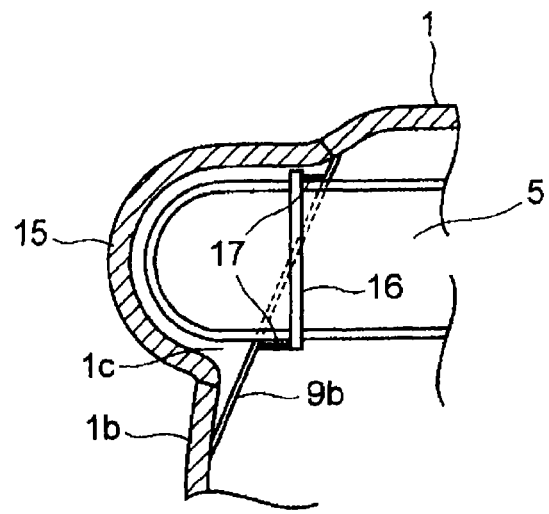
FIG. 5 is an enlarged cross-sectional view of a portion A of FIG. 4.

FIG. 4 is a front view schematically illustrating a configuration of a fourth embodiment of the moisture separator reheater according to the present invention. FIG. 5 is an enlarged cross-sectional view of a portion A of FIG. 4.

As illustrated in FIG. 4, the moisture separator reheater according to the present embodiment includes only a single tier of heat transfer tube group. More specifically, the moisture separator reheater according to the present embodiment includes only the first heat transfer tube group 5 as the heat transfer tube group and the first heater header 7 as the heater header.

The bent tube part 14 (ineffective portion) of the first heat transfer tube group 5 is provided outside the end plate 1b. That is, as illustrated in FIG. 5, the end plate 1b has an opening 1c, through which the bent tube part 14 is brought outside. A lid portion 15 is fitted to the opening 1c to cover the bent tube part 14.

Moreover, there is mounted to the bent tube part 14 a support plate 16, by which the bent tube part 14 of the first heat transfer tube group 5 is supported.

The partition plate 9b is disposed so as to prevent the steam from flowing in the bent tube part 14. The first heater header 7 is installed so as to be inserted through the end plate 1a up to outer surface of the partition plate 9a.

A guide plate 17 is installed between the partition plate 9b and the support plate 16 so as to preventing the steam from flowing to the bent tube part 14.

As described above, according to the present embodiment, even when the moisture separator reheater includes only a single tier of heat transfer tube group, the ineffective portion can be reduced, thereby allowing a heat transfer area to be ensured with a shorter tube bundle. As a result, the size of the moisture separator reheater can be reduced.

Fifth Embodiment

Figure 6:
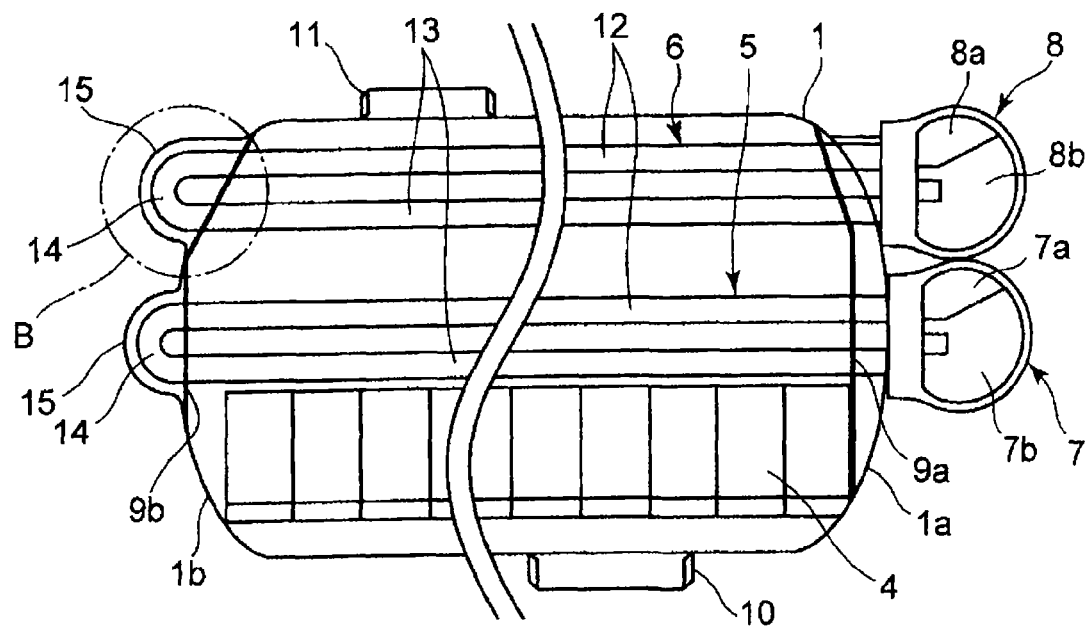
FIG. 6 is a front view schematically illustrating a configuration of a fifth embodiment of the moisture separator reheater according to the present invention.

FIG. 6 is a front view schematically illustrating a configuration of a fifth embodiment of the moisture separator reheater according to the present invention.

Figure 7:
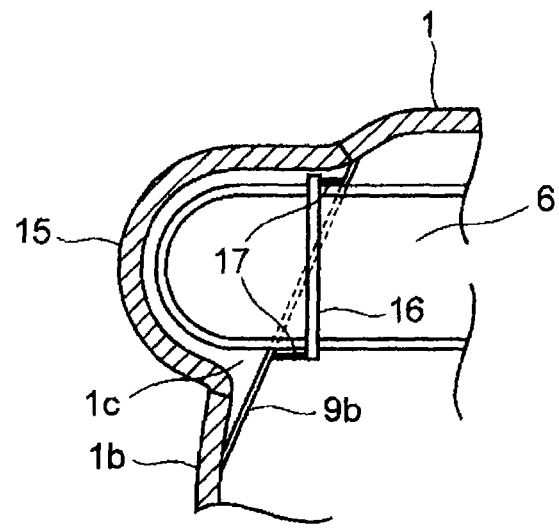
FIG. 7 is an enlarged cross-sectional view of a portion B of FIG. 6.

FIG. 7 is an enlarged cross-sectional view of a portion B of FIG. 6.

As illustrated in FIG. 6, in the moisture separator reheater according to the present embodiment, both the first and the second heater headers 7 and 8 are installed adjacent to each other on the same side (end plate 1a side) such that the entire bodies thereof are exposed outside. The partition plate 9a is bent inward from a portion near the second heater header 8 so as to avoid the end plate 1a located near the second heater header 8.

The first and the second heat transfer tube groups 5 and 6 are installed such that the heated fluids therein flow in the same direction. Moreover, the bent tube parts 14 (ineffective portions) of the respective first and the second heat transfer tube groups 5 and 6 are provided outside the end plate 1b. The end plate 1b has two openings 1c, through which the bent tube parts 14 are brought outside. The lid portions 15 are fitted respectively to the openings 1c to cover the two bent tube parts 14.

Moreover, there is mounted to each of the bent tube parts 14 a support plate 16, by which the bent tube part 14 of each of the first and the second heat transfer tube groups 5 and 6 is supported. The partition plate 9b is disposed so as to prevent the steam from flowing in the bent tube parts 14. A guide plate 17 is installed between the partition plate 9b and the support plate 16 so as to preventing the steam from flowing to each bent tube part 14.

As describe above, according to the present embodiment, the bent tube parts 14 (ineffective portions) of the first and the second heat transfer tube groups 5 and 6 are brought outside the end plate 1b through the opening portions 1c, so that the ineffective portion can be reduced, thereby allowing a heat transfer area to be ensured with a shorter tube bundle. As a result, the size of the moisture separator reheater can be reduced.

Sixth Embodiment

Figure 8:
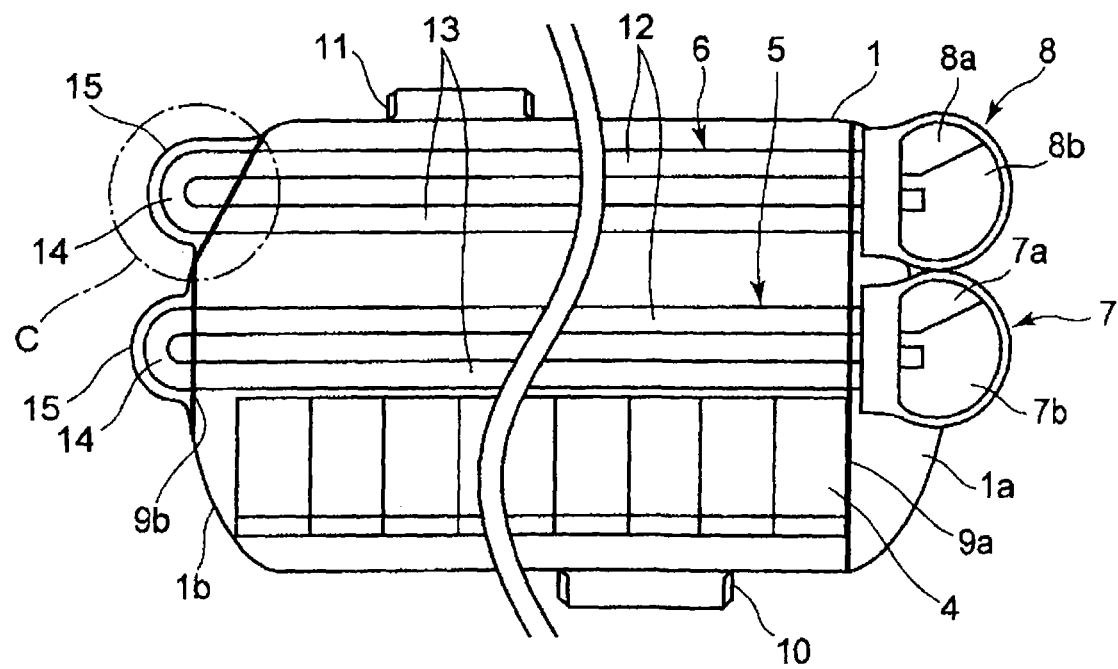
FIG. 8 is a front view schematically illustrating a configuration of a sixth embodiment of the moisture separator reheater according to the present invention.
Figure 9:
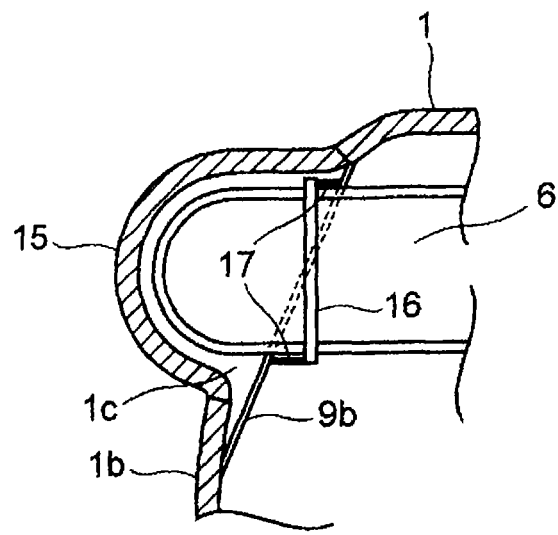
FIG. 9 is an enlarged cross-sectional view of a portion C of FIG. 8.

FIG. 8 is a front view schematically illustrating a configuration of a sixth embodiment of the moisture separator reheater according to the present invention. FIG. 9 is an enlarged cross-sectional view of a portion C of FIG. 8.

As illustrated in FIG. 8, the moisture separator reheater according to the present embodiment differs from the moisture separator reheater according to the fifth embodiment in that the first and the second heater headers 7 and 8 are installed on the same side (end plate 1a side) so as to be inserted through the end plate 1a up to outer surface of the partition plate 9a. Other configurations and operations are the same as the fifth embodiment, and descriptions thereof will be omitted.

As described above, according to the present embodiment, the first and the second heater headers 7 and 8 are installed on the same side (end plate 1a side) so as to be inserted through the end plate 1a up to outer surface of the partition plate 9a, so that it is possible to further reduce the ineffective portions on the sides of the first and the second heater headers 7 and 8, in addition to the effect obtained in the fifth embodiment. This allows a heat transfer area to be ensured with a shorter tube bundle, with the result that the size of the moisture separator reheater can be further reduced.

Seventh Embodiment

Figure 10:
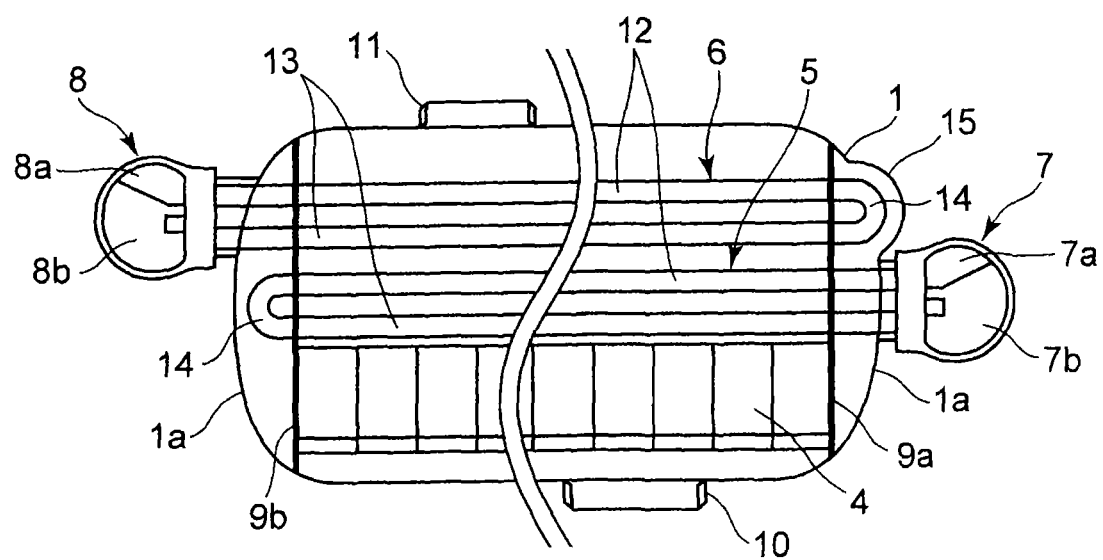
FIG. 10 is a front view schematically illustrating a configuration of a seventh embodiment of the moisture separator reheater according to the present invention.

FIG. 10 is a front view schematically illustrating a configuration of a seventh embodiment of the moisture separator reheater according to the present invention.

As illustrated in FIG. 10, the moisture separator reheater according to the present embodiment differs from the moisture separator reheater according to the first embodiment in that the bent tube part 14 (ineffective portion) of the first heat transfer tube group 5 extends up to near an inner surface of the end plate 1b.

The bent tube part 14 (ineffective portion) of the second heat transfer tube group 6 is provided outside the end plate 1a. That is, the end plate 1a has the opening 1c (refer to FIG. 5, 7, etc), which has been described in the fourth and the fifth embodiments, through which the bent tube part 14 is brought outside. The lid portion 15 is fitted to the opening 1c to cover the bent tube part 14.

The partition plate 9a is integrally formed so as to vertically extend, in a flat plane, from one side surface of the moisture removal section 4 toward the inside of the bent tube part 14 of the second heat transfer tube group 6 through a part of the first heat transfer tube group 5 located near the first heater header 7.

The partition plate 9b is integrally formed so as to vertically extend, in a flat plane, from the other side surface of the moisture removal section 4 toward a part of the second heat transfer tube group 6 located near the second heater header 8 through the inside of the bent tube part 14 of the first heat transfer tube group 5.

As described above, according to the present embodiment, the pair of partition plates 9a and 9b that remove the ineffective portions can each be formed so as to extend vertically in a flat plane. Thus, as in the third embodiment, it is possible to reduce an unnecessary space in the body drum 1 that is not involved in the moisture separator reheater performance with the partition plates 9a and 9b having the minimum size. As a result, the size of the moisture separator reheater can be further reduced.

Other Embodiments

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the first and the fifth embodiments, the entire bodies of the first and the second heater headers 7 and 8 are exposed outside the end plates 1a and 1b. However, as the embodiments other than the first and the fifth embodiments, the first and the second heater headers 7 and 8 may be installed so as to be inserted through the end plates 1a and 1b up to outer surfaces of the pair of partition plates 9a and 9b.

In short, it is only necessary that the first and the second heater headers 7 and 8 are at least partially exposed outside the end plates 1a and/or 1b so as to be able to supply and exhaust the heated fluid.

What is claimed is:

1. A moisture separator reheater comprising:
a horizontal cylindrical body drum having a steam inlet at a bottom of the body drum for receiving steam to be heated and a steam outlet at a top of the body drum for discharging heated steam;
end plates formed at both end portions of the body drum in a longitudinal direction thereof, and exposed outside;
a moisture removal section for removing moisture in the steam distributed inside the body drum;
a heat transfer tube group disposed above the moisture removal section, wherein a heating fluid for heating the steam is distributed in the heat transfer tube group;
a heater header arranged to supply the heating fluid to the heat transfer tube group and exhaust outside the heating fluid that has been heat exchanged with the steam; and
a partition plate disposed inside the body drum and between the end plates so as to guide the steam from the moisture removal section to the heat transfer tube group;
the heat transfer tube group including a plurality of heat transfer tubes each having a forward passage part, a backward passage part, and a bent tube part,
the forward and the backward passage parts extending in the longitudinal direction of the body drum and the bent tube part connecting the forward and the backward passage parts,
the bent tube part being provided outside at least one of the end plates, and
the heater header being exposed outside the end plates.

2. The moisture separator reheater according to claim 1, wherein
the bent tube part provided outside the end plate is covered with a lid portion.

3. The moisture separator reheater according to claim 1, wherein
the partition plate is formed into a flat plane, disposed on a side surface of the moisture removal section and on an inward side of the bent tube part.

4. The moisture separator reheater according to claim 1, wherein
the heat transfer tube group includes, from a lower side to an upward side, a first heat transfer tube group and a second heat transfer tube group, and
the heating fluid flowing in the second heat transfer tube group has a temperature higher than the heating fluid flowing in the first heat transfer tube group.

5. The moisture separator reheater according to claim 1, wherein
the heater header is inserted through the end plate up to an outer surface of the partition plate.

6. A nuclear power plant comprising:
a high pressure turbine; and
a moisture separator reheater that removes moisture in steam to be heated exhausted from the high pressure turbine and reheats the resultant steam to be heated, the moisture separator reheater including:
a horizontal cylindrical body drum having a steam inlet at a bottom of the body drum for receiving steam to be heated and a steam outlet at a top of the body drum for discharging heated steam;
end plates formed at both end portions of the body drum in a longitudinal direction thereof, and exposed outside;
a moisture removal section for removing moisture in the steam distributed inside the body drum;
a heat transfer tube group disposed above the moisture removal section, wherein a heating fluid for heating the steam is distributed in the heat transfer tube group;
a heater header arranged to supply the heating fluid to the heat transfer tube group and exhaust outside the heating fluid that has been heat exchanged with the steam; and
a partition plate disposed inside the body drum and between the end plates so as to guide the steam from the moisture removal section to the heat transfer tube group;
the heat transfer tube group including a plurality of heat transfer tubes each having a forward passage part, a backward passage part, and a bent tube part,
the forward and the backward passage parts extending in the longitudinal direction of the body drum and the bent tube part connecting the forward and the backward passage parts,
the bent tube part being provided outside at least one of the end plates, and
the heater header being exposed outside the end plates.

* * * * *